United States Patent

Schlatter et al.

[11] Patent Number: 5,597,132
[45] Date of Patent: Jan. 28, 1997

[54] TAPE WINDING DEVICE PROVIDING UNIFORM WINDING AND RAPID INSTALLATION AND REMOVAL OF WINDING ARM

[75] Inventors: Manfred Schlatter, Freiburg; Bernd Scholtysik, Munich, both of Germany

[73] Assignee: BASF Magnetics GmbH, Mannheim, Germany

[21] Appl. No.: 570,201

[22] Filed: Dec. 11, 1995

Related U.S. Application Data

[63] Continuation of Ser. No. 199,013, Feb. 18, 1994, abandoned.

[30] Foreign Application Priority Data

Feb. 20, 1993 [DE] Germany ............................ 9302492 U

[51] Int. Cl.[6] .................................................. B65H 18/26
[52] U.S. Cl. .................................................. 242/547
[58] Field of Search .................................. 242/547, 548, 242/615.4, 615.3, 615.2, 908

[56] References Cited

U.S. PATENT DOCUMENTS

| | | |
|---|---|---|
| 3,033,074 | 5/1962 | Schaefer ............................ 242/615.3 |
| 3,387,798 | 6/1968 | Young et al. . |
| 3,749,328 | 7/1973 | Dusenbery ............................ 242/547 |
| 3,912,186 | 10/1975 | Bruck et al. ............................ 242/547 |
| 4,182,472 | 1/1980 | Peekna ............................ 242/615.4 |
| 4,305,536 | 12/1981 | Burdorf et al. ............................ 242/615.4 |
| 5,040,737 | 4/1991 | Zeroni et al. . |
| 5,224,641 | 7/1993 | Spicer ............................ 242/615.4 |

FOREIGN PATENT DOCUMENTS 297609 10/1993 European Pat. Off. .

*Primary Examiner*—Daniel P. Stodola
*Assistant Examiner*—Emmanuel M. Marcelo
*Attorney, Agent, or Firm*—Keil & Weinkauf

[57] ABSTRACT

This tape winding arm is part of a winding device for film strips, tape or other similar medium, where the medium is wound up onto rolls. The medium passes over the end of the winding arm along guiding and deflecting elements on a cushion of compressed air, which is supplied through a hollow in the arm, and past a rotating pinch roller. This pinch roller is also part of the winding arm, and the winding arm is made of lightweight metal and pivots, so that its pinch roller rests on the tape roll, helping to ensure even winding through constant contact with the roll. The winding arm consists of two parts screwed together at the pivot point; this allows easy disassembly and removal from the pivot spindle.

4 Claims, 2 Drawing Sheets

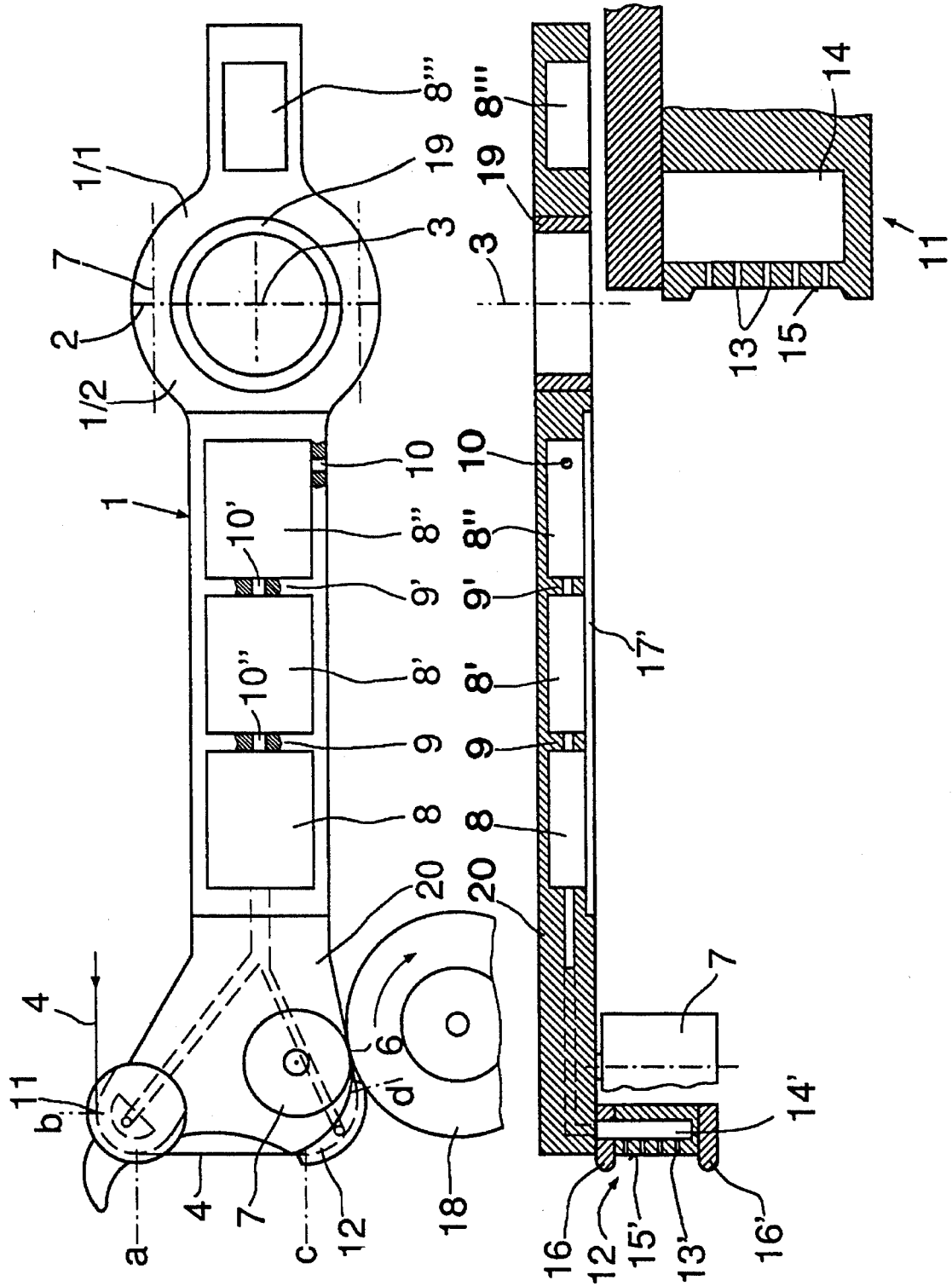

TAPE WINDING DEVICE PROVIDING UNIFORM WINDING AND RAPID INSTALLATION AND REMOVAL OF WINDING ARM

This application is a continuation of application Ser. No. 08/199,013, filed on Feb. 18, 1994, now abandoned.

The innovation relates to a winding device for recording media in tape form, in particular magnetic tapes, having at least one tape winding element which can be rotatingly driven in order to wind up the tape, the latter being pressed at the point where it is being wound up onto the roll of tape against said roll by a pinch roller having a flexible bearing surface and connected to a pivotable guide arm.

The prior art discloses installations for the production of tape strips in which a continuous web of film is cut longitudinally to form individual strips. The cut film strips are then wound up individually on a winding-up unit onto reels or flangeless winding hubs. In such cases, the tape winding elements may be arranged in a row one behind the other or one next to the other in the running direction of the film strips, or if there is a relatively large number of film strips to be wound up they may also be arranged in a plurality of rows of winding-up units on levels one above the other. Such winding apparatuses are described, for example, in DOS 3,908,451, EP 0,297,609 and the German Application under the number P 42 03 310.

During winding up of the film strips, it is very important to achieve a tape roll of a satisfactory appearance without protruding turns of tape. It has been shown, inter alia, that in cases of vertical runouts which are attributable to poor centering of the winding hubs on the hub mount, the winding arm is unable, owing to its mass and its moment of inertia, to follow rapid vertical runouts of the tape roll, resulting in a poor roll profile. Furthermore, it is important for reasons of cost-effectiveness that, during the assembly of the individual winding arms on the winding-up unit and also during removal of a single winding arm for repair reasons, this handling can be carried out as efficiently and simply as possible in order not to have excessive assembly and repair times at the winding stations.

It is therefore an object of the present innovation to find a winding device of the generic type stated at the beginning by which both a good winding profile is achieved and at the same time the installation and removal of a single winding arm can be carried out in a simple way. Furthermore, it is an object of the present innovation to find for the tape guiding devices connected to the winding arm a simple structural design of the air supply for acting on the running surfaces.

We have found that these objects are achieved by a winding device for recording media in tape form, in particular magnetic tapes, having at least one tape winding element (18) which can be rotatingly driven in order to wind up the tape (4), the latter being pressed at the point (6) where it is being wound up onto the roll of tape (18) against said roll by a pinch roller (7) having a flexible bearing surface and connected to a pivotable guide arm (1), which comprises a guide arm (1) which can be divided in the parting plane (2), which runs centrally through the pivot axis (3) perpendicularly with respect to the longitudinal direction of the guide arm (1) and with respect to the pivot axis, can be joined together by screwed joints (5, 5'), is provided with inner cavities (8, 8', 8", 8''') and has vertical reinforcing ribs (9, 9') with grooves or bores (10', 10") running perpendicularly with respect to said ribs and also a supply opening (10) for conducting compressed air through the cavities a part-circular tape deflection (11) for the incoming tape strip (4), comprising a hollow-cylindrical running surface (15) provided with bores (13) for the compressed air emanating from an inner supply space (14), the adjacent supply space (14) being connected to the cavity (8) and to the supply opening (10)

a tape guiding and deflecting element (12) for guiding the tape strip to the winding-up point (6), comprising a part-circular running surface (15'), which is likewise provided with bores (13') for conducting compressed air through and with flanged disks (16, 16'), arranged on both sides of the running surface (15'), for lateral guidance of the film strip.

Further details of the invention emerge from the subclaims, the drawings and also from the description.

The innovation is explained in more detail below with reference to the figures, in which:

FIG. 1 shows a plan view of the winding device according to the innovation

FIG. 2 shows a corresponding longitudinal section

FIG. 3 shows a cross section through the tape deflecting element on the inlet side.

Figure 4A:
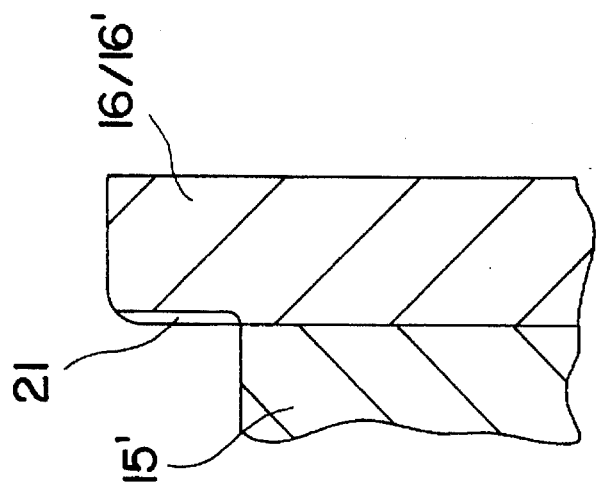
FIGS. 4 and 4a show radial slits on the inner side of the flanged disks.
Figure 4:
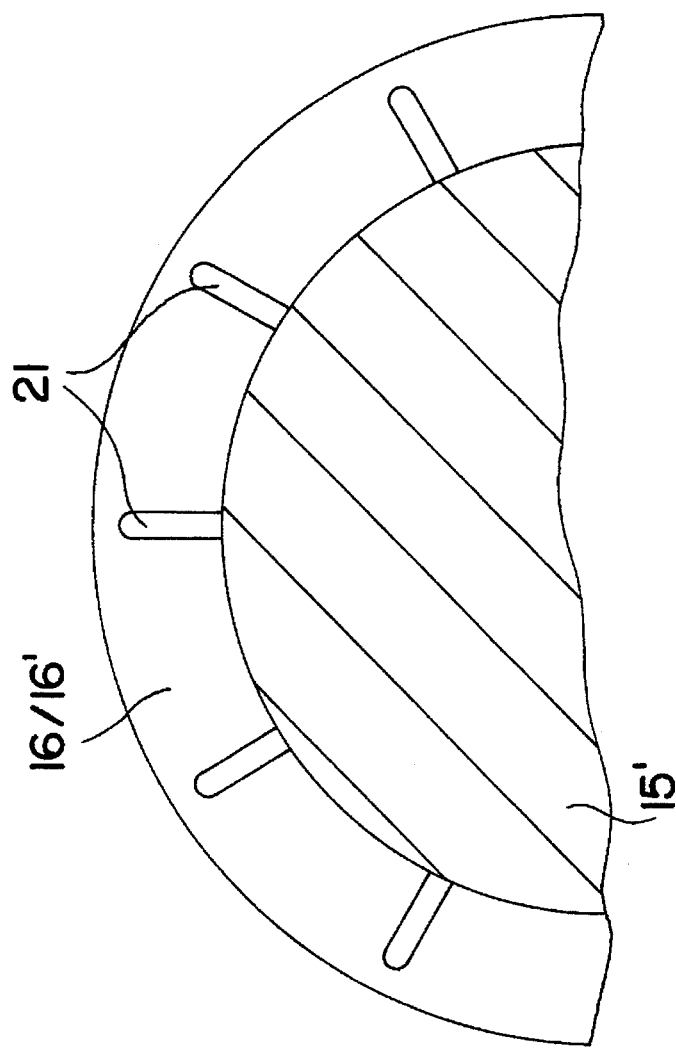

The mounting of the guide arm (1) on the bearing ring and on the spindle (not shown) is accomplished as usual by a radial bearing (not drawn) and a thrust bearing on each of both sides. An essential feature of the innovation is that the guide arm (1) comprises two prefabricated parts (1/1, 1/2), which are joined together at the parting plane (2) by screwed joints (5, 7). The parting plane runs centrally through the pivot axis (not shown) perpendicularly with respect to the longitudinal direction of the guide arm and perpendicularly with respect to the pivot axis. As a result, the bearing spindle (3) forms a unit with the bearing ring (19) surrounding it. Said unit is fixedly assembled without the winding arm (1) on the shaft receiving the arms and allows each winding arm to be fastened independently of the assembly of the mounting at a subsequent time on the assigned bearing ring (19). The two parts (1/1 and 1/2) of the arm (1) are produced independently of each other, their mutually confronting end faces being finish-machined and then screwed together. Then, the internal bore is fine-machined or finish-machined. This has the advantage that, irrespective of the distance between the individual winding arms lying next to each other, the mounting with the bearing rings can be completely preassembled and then installed in the winding machine. The winding arms are fastened on the bearing rings at a later time and, if need be, can be laterally displaced and adjusted independently of the mounting; this is possible both during initial assembly and at any time during use of the machine, for example for correcting the distances between winding arms. If a winding arm is to be removed for repair reasons, each arm can be individually taken out and exchanged irrespective of its position in the machine. According to the previously known prior art, if the bearing ring forms a structural unit with the winding arms, for this purpose the entire shaft, on which all the arms are seated, always has to be removed.

The arm is worked from a solid piece of aged undistorted aluminum material by high-speed machining, which ensures dimensional stability at the same time as low mass. To reduce the mass, the arm is made with internal cavities (8, 8', 8", 8'''), between which there are reinforcing ribs (9, 9'). The lateral faces (17, 17') also serve for reinforcement, one of the faces (17) being produced by appropriate shaping and the other being adhesively attached as a cover (17') in an airtight manner over the cavities (8, 8', 8"), as can be seen in FIG. 2. Adjacent to the pivot axis there is on the outside of the winding arm a supply opening (10) for introducing and conducting compressed air through the inner cavities of the winding arm (1). For this purpose, the latter has on the reinforcing ribs (9, 9') longitudinally running grooves or bores (10', 10") for conducting the compressed air through to the tape deflecting elements, which are still to be described later and are located at the free end of the guide arm.

The air conduction described is of advantage since it takes place without any additional ducting means right through the components of the guide arm to the discharge points, the tape guides (11, 12). As a result, components are saved and the assembly or disassembly of components is possible without any problems since only few seals are required and since the air supply to each individual guide arm takes place via tubes in the vicinity of the pivot point of the guide arm, where influences on the mobility of the arm are at their least. As a result, the region of the film strips is kept clear of laid tubes, on which dirt could settle and then find its way onto the product, for example the magnetic tape surface.

At the free end of the guide arm (1), the non-rotatably mounted tape guide elements (11, 12) and the rotatably mounted pinch roller (7) are fastened on a work plate (20). The incoming foil strip (4) runs, in the case of a magnetic recording medium preferably with its rear side, over the tape guide or part-circular tape deflection (11), which is shown in more detail in cross section in FIG. 3. The tape deflection consists of aluminum to meet the requirement for low mass, the surface being hard-anodized. The running surface (15) is provided with a number of fine bores (13), through which compressed air for floating guidance of the film strip flows out from the buffer space (14), to which in turn compressed air can be admitted via the cavities (8). The fine bores preferably have a diameter of about 0.2 mm. They are arranged, for example, in rows of 5 bores each in such a way that there is optimum floating guidance of the tape without contact with the tape deflection and without lateral tape guidance. The bores (13) are arranged on the tape deflection (11) preferably only in the part-circle region a–b, where the tape is guided over the deflection. The width of the running surface is 1 to 2 mm wider than the width of the film strip; the lateral flanks are inclined by about 20°.

The film strip (4) subsequently runs over the likewise part-circular tape guiding element (12) onto the tape roll (18). The tape guiding element (12) is shown in more detail, in cross section, in the left-hand part of FIG. 2. The running surface (15') is likewise provided with fine bores (13'), through which compressed air for floating guidance of the film strip flows out from the volume (14'). As in the case of the tape guiding element (11), the running surface consists of anodized aluminum. For lateral guidance of the tape, flanged disks (16, 16') of wear-resistant material, preferably hard metal of superfine-grain quality, are arranged on both sides of the running surface. The guiding width of the running surface (15') is only slightly greater, for example 10 μm, than the width of the film strip. The height of the parallel faces of the flanged disks (16, 16') protrudes only a little, for example 0.5 mm, above the running surface (15') and further up, away from the running surface, the guide widens in order to permit easier insertion of the film strip and furthermore to restrict the guiding width to the necessary size, it being intended in this way to eliminate possible damage to the edges of the film strips. To facilitate the flowing away of the compressed air, the flanged disks (16, 16') may be provided on their inner side with radial slits (21). In the run-in and run-out region of the flanged disks, curvatures are likewise provided, for example with a radius of 1 mm, in order to ensure smooth running in and out without edges which could cause damage to the film edges.

In analogy with the tape deflecting element (11), it is also the case with the tape guiding element (12) that only the regions c–d, in which the tape is circularly guided, are provided with bores (13'). At the runout of the tape guiding element (12), the film strip is wound up onto the tape roll (18) in the direction of the arrow and at this point (6) it is pressed by the rotatable pinch roller (7) against the roll of tape. The pinch roller preferably has a flexible surface.

We claim:

1. In a winding device for recording media in tape form having at least one tape winding element which is rotatably driven when a tape is wound onto a tape roll, said tape being engaged by a tape guiding and deflecting element provided with an airguide surface which causes said tape to reach a predetermined winding up point on the roll, a guide arm having a free end and a joint end and being pivotally mounted on a pivot means in a pivot plane which is in the plane of said tape roll, the guide arm extending up to the tape roll, a tubular member secured to said guide arm and connected to an air pressure source for conducting air under pressure to said tape guiding and deflecting element, and a pressure means for biasing said air-guide surface onto said tape as it is being wound onto the tape roll, the improvement therein comprising:

the guide arm connected at its free end to said tape guiding and deflecting element, and the guide arm communicating with said tubular member for conducting air pressure to said tape guiding and deflecting element, the guide arm having a structure provided with a plurality of cavities which are positioned along the longitudinal axis of the guide arm and separated from each other by walls arranged as transversal axes of the guide arm, said walls having bores therein for conducting said air under pressure through the cavities to the guiding and deflecting means, the joint end of the guide arm consisting of two parts which are connected to each other in the pivot plane of the guide arm and form a circular hole having an inner diameter, the pivot means having an axis and at least one rotatable mounting ring thereon, the outer diameter of the at least one rotatable mounting ring mating with the inner diameter of the circular hole, so that the joint end of the guide arm is rotatable on said axis and provides a pivoting movement to said guide arm with said tape guiding and deflecting element at its free end, and when the guide arm is directly biased by said pressure means, said air guide surface of the tape and deflecting element is biased onto said tape guiding at said predetermined winding point on said tape roll.

2. A winding device for recording media in tape form as defined in claim 1, wherein the airguide surface of the tape guiding and deflecting element is provided with bores for the air under pressure, and the airguide surface is restricted on each side thereof by adjacent flanged disks of wear resistant material, said disks having radially running air slits and being spaced from each other.

3. A winding device as defined in claim 2, wherein the guide arm and the air guide surface of the tape guiding and deflecting element are made from aluminum.

4. The winding device for recording media in tape form as defined in claim 1, wherein a supply opening for conducting compressed air through the cavities is located on the guide arm adjacent to the pivot axis thereof.

* * * * *